Nov. 11, 1924.  
V. C. CRITES ET AL  
1,515,093  
PROCESS OF DEHYDRATING OIL  
Filed Feb. 4, 1924
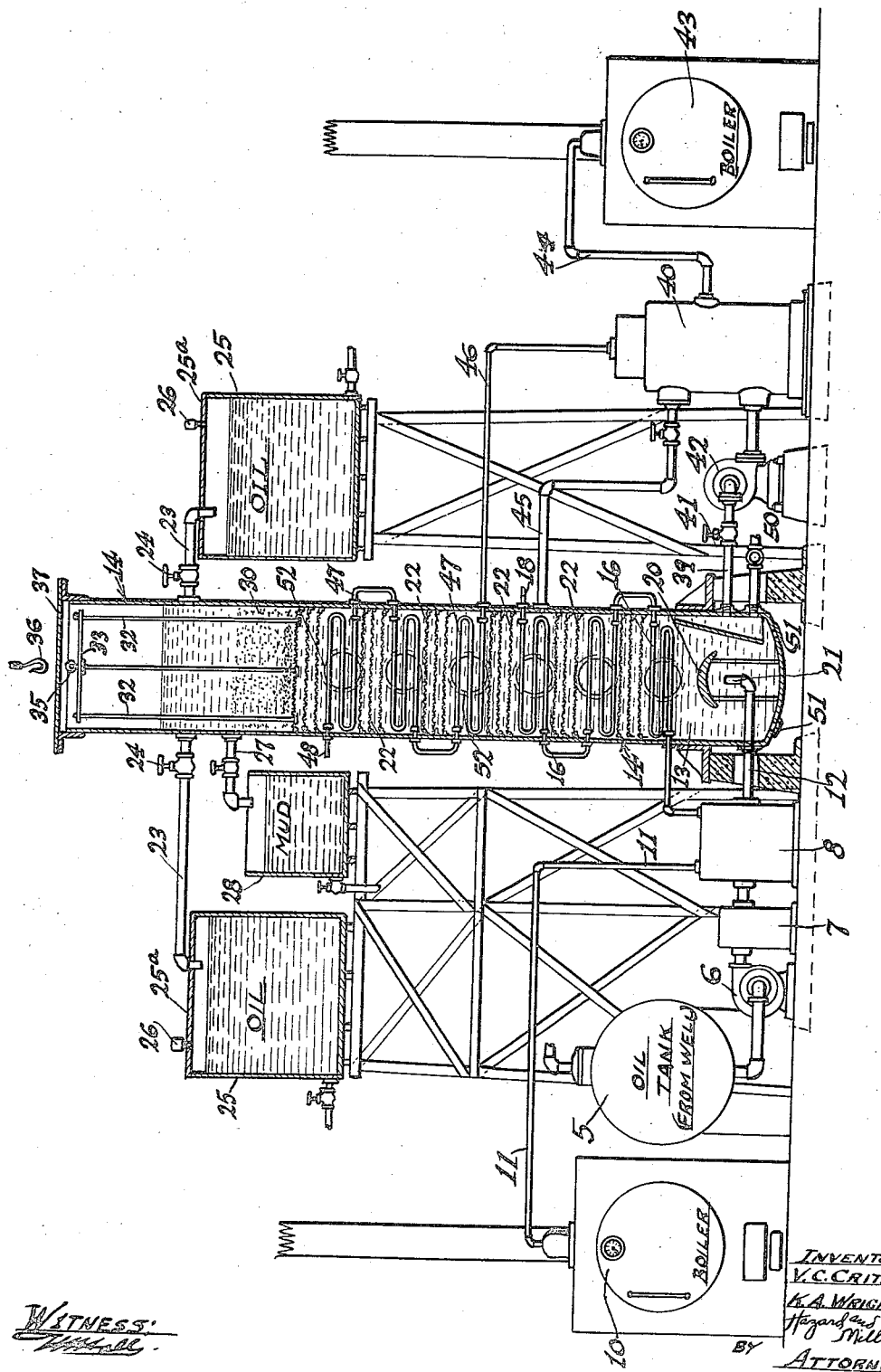
WITNESS:
INVENTORS  
V. C. CRITES  
K. A. WRIGHT  
BY Hazard and Miller  
ATTORNEYS Patented Nov. 11, 1924.

1,515,093

UNITED STATES PATENT OFFICE.

VIRGIL C. CRITES AND KENNETH A. WRIGHT, OF LOS ANGELES, CALIFORNIA, ASSIGNORS, BY DIRECT AND MESNE ASSIGNMENTS, TO AMERICAN OIL DEHYDRATING CO., OF LOS ANGELES, CALIFORNIA, A CORPORATION OF CALIFORNIA.

PROCESS OF DEHYDRATING OIL.

Application filed February 4, 1924. Serial No. 690,529.

*To all whom it may concern:*

Be it known that we, VIRGIL C. CRITES and KENNETH A. WRIGHT, citizens of the United States, residing at Los Angeles, in the county of Los Angeles and State of California, have invented new and useful Improvements in Processes of Dehydrating Oil, of which the following is a specification.

This invention relates to a process for treating oils.

An object of our invention is the provision of a process for dehydrating oils and is especially applicable to crude oils for the purpose of rendering the same free from water, although the process may be used with other oils.

Other objects of our invention will be apparent during a reading of the following specification.

It is well known that crude oil as produced from wells contains a considerable amount of water which occurs in the oil as both a suspension and as an emulsion. It has been found difficult to separate the oil from the water, and especially from the water, which occurs in the form of an emulsion.

According to our invention a practically complete separation of the oil and the admixed water may be effected by treating the crude oil with a dehydrating agent. The dehydrating agent may be for example, calicum chloride, and this is preferably employed in a solution, the specific gravity of which solution is a factor affecting the efficiency of the process. According to our tests thus far the preferred specific gravity of the calcium chloride solution is from 1.35° to 1.6° Baumé at 120° F. and this solution is preferably heated for treating the oil and the temperature is suitable at 180° F.

During the action of the calcium chloride on the water contained in the oil, the specific gravity of the calcium chloride solution will be diminished due to the absorption of water from the oil and will pass outside the proper limits. When this stage has been reached, the calcium chloride solution is withdrawn and may be evaporated until the proper specific gravity is restored, when it may be used again.

Before the oil is subjected to the dehydrating action of the calcium chloride solution it is preferably preheated and a suitable temperature range has been found by us to be from 140° to 200° F.

Our invention may be practised with various forms of apparatus but for purpose of illustration it will be described in connection with one form of apparatus shown in the accompanying drawing, in which the numeral 5 indicates a tank containing the crude oil to be dehydrated and from which it is withdrawn by a pump 6 and sent through a series of screens contained in a vessel 7 for filtration purposes. From the vessel 7 the oil is pumped into a preheater 8 which receives steam from a boiler 10 through a pipe line 11. The crude oil is heated in the preheater 8 preferably to a temperature within the range of 140° to 200° F.

The oil leaves the preheater 8 and enters a pipe 12 which ends in a solution of calcium chloride 13 held in a container 14 which encloses portions of a steam coil 16 leading from the preheater 8 and ending at a point 18 outside of the container 14 where the steam discharges into the atmosphere. The steam in the coil 16 heats the surrounding liquids to a temperature which is preferably 180° F.

The container 14 also comprises a baffle plate 20 spaced above the orifice 21 of the oil pipe 12 for the purpose of taking out particles of solid matter contained in the oil.

The oil which is discharged from the orifice 21 of the feed pipe 12 rises through the calcium chloride solution 13 and passes through a series of transverse spaced screens 22 supported in the container 14. The screens 22 are preferably of gradually smaller mesh as they rise in the container 14, and serve the purpose of rejecting solid particles contained in the oil, but are provided mainly to break up the oil and thus expose an increased oil surface to the action of the dehydrating agent.

The dehydrated oil rises to the top of the container 14 from which it may be withdrawn on either side through pipes 23 provided with valves 24 and discharged into elevated tanks 25 having covers 25ª provided with vents 26.

Provision is made as by a pipe 27 ending above a tank 28, for withdrawing sediment which may collect in the container or tank 14 at a position 30.

The uppermost of the plates 22 collects an objectionable amount of sediment, which it is desirable to remove, and to facilitate its removal the top plate is secured to spaced vertical rods 32 connected at their upper ends by a transverse horizontal bar 33 provided with an eyebolt 35 which may be engaged by a hook 36 when a vented cover 37 of the container is removed and thus the top plate may be lifted from the container and cleaned.

When the specific gravity of the calcium chloride solution has been diminished by absorption of water from the oil to such an extent that it is outside suitable limits, it may be withdrawn from the container 14 through a pipe 39 to an evaporator 40. The pipe 39 is provided with a valve 41 and is connected to a pump 42 which draws the calcium chloride solution from the container 14 and pumps it into the evaporator 40. The evaporator 40 receives steam from a boiler 43 through a pipe 44 for the purpose of evaporating the calcium chloride solution until it reaches the desired specific gravity, which may be 1.5° Baumé at 120° F. The calcium chloride is returned to the tank 14 through a pipe 45.

The steam is discharged from the evaporator 40 through a pipe 46 which leads to a coil 47 partly enclosed by the tank 14 and ending at the orifice 48 where the steam discharges into the atmosphere. The steam in thes coil 47 heats the liquid surrounding it to a suitable temperature, which may be 180° F.

A steam pipe 50 is shown entering near the bottom of the tank 14 which may be used when it is necessary to clean the tank and discharge gates 51 are shown at the bottom of the tank for the discharge of sediment.

Manholes 52 are provided in the tank shell to facilitate entrance into the tank when necessary.

While we have herein described one form of our invention, modifications thereof may be devised without departing from the spirit thereof, and it is to be understood that such modifications come within the scope of this invention.

We claim as our invention:

1. The process of dehydrating oil comprising treating the oil with a solution of calcium chloride.

2. The process of dehydrating oil comprising treating the oil with a solution of calcium chloride having a specific gravity ranging substantially from 1.35° to 1.6° Baumé.

3. The process of dehydrating oil comprising treating the oil with a heated solution of calcium chloride.

4. The process of dehydrating oil comprising treating the oil with a solution of calcium chloride heated to a temperature of the order of 180° F., the specific gravity of the solution being substantially between 1.35° and 1.6° Baumé at 120° F.

5. The process of purifying crude oil comprising preheating the oil and subsequently passing the oil thru a heated solution of calcium chloride.

6. The process of purifying crude oil comprising preheating the oil to a temperature ranging between 140° and 200° F. and subsequently passing the oil thru a solution of calcium chloride heated to a temperature of the order of 180° F., the specific gravity of the calcium chloride solution being between 1.35° and 1.6° Baumé.

7. The process of purifying crude oil comprising preheating the oil, passing the oil thru a heated solution of calcium chloride and simultaneously filtering the oil.

8. The process of dehydrating oil comprising the absorption of the water held in suspension in the oil by a solution of calcium chloride.

9. The process of dehydrating oil comprising the treatment of oil containing water held in emulsion with the oil by a solution of calcium chloride.

In testimony whereof we have signed our names to this specification.

VIRGIL C. CRITES.
KENNETH A. WRIGHT.